(12) United States Patent
Holt et al.

(10) Patent No.: US 10,278,379 B2
(45) Date of Patent: May 7, 2019

(54) SYSTEMS, METHODS AND DEVICES FOR BIRD SCARE DEVICE

(71) Applicants: Timothy Holt, Salt Lake City, UT (US); Allison Drennan, Salt Lake City, UT (US); Eric Snaufer, Salt Lake City, UT (US); Abigail Slama-Catron, Salt Lake City, UT (US); Katelin Drennan, Salt Lake City, UT (US)

(72) Inventors: Timothy Holt, Salt Lake City, UT (US); Allison Drennan, Salt Lake City, UT (US); Eric Snaufer, Salt Lake City, UT (US); Abigail Slama-Catron, Salt Lake City, UT (US); Katelin Drennan, Salt Lake City, UT (US)

(73) Assignees: Timothy Holt, Salt Lake City, UT (US); Allison Drennan, Salt Lake City, UT (US); Eric Snaufer, Salt Lake City, UT (US); Abigail Slama-Catron, Salt Lake City, UT (US); Katelin Drennan, Sale Lake City, UT (US)

( * ) Notice: Subject to any disclaimer, the term of this patent is extended or adjusted under 35 U.S.C. 154(b) by 0 days.

(21) Appl. No.: 15/883,455

(22) Filed: Jan. 30, 2018

(65) Prior Publication Data
US 2018/0213768 A1    Aug. 2, 2018

Related U.S. Application Data

(60) Provisional application No. 62/453,063, filed on Feb. 1, 2017.

(51) Int. Cl.
*A01M 29/06*    (2011.01)

(52) U.S. Cl.
CPC ................................. *A01M 29/06* (2013.01)

(58) Field of Classification Search
CPC ....... A01M 29/00; A01M 29/06; G09F 19/08; G09F 2019/086; G09F 13/16
USPC ....................................................... 340/573.2
See application file for complete search history.

(56) References Cited

U.S. PATENT DOCUMENTS

| | | | | |
|---|---|---|---|---|
| 5,966,075 A | * | 10/1999 | Blanks | A01M 29/06 119/712 |
| 6,681,714 B1 | * | 1/2004 | Johnson | A01K 15/02 116/22 A |
| 10,045,524 B2 | * | 8/2018 | Nofziger | A01M 29/06 |

(Continued)

*Primary Examiner* — Eric Blount
(74) *Attorney, Agent, or Firm* — Benjamin J. Holt; Stoel Rives LLP

(57) ABSTRACT

A portable bird scare device uses airflow to create random movement of a sock. For example, a portable bird scare device can be constructed from a toolbox, marine fan, waterproof switch, deep-cycle battery, fuse, ripstop nylon tube, plumbing pipe and plumbing pipe connectors. A switch can control power between the fan and a battery protected by the fuse. The fan can drive air from within the toolbox through pipe and connectors to the ripstop nylon tube. By controlling the dimensions of the ripstop nylon tube, the ripstop nylon tube can be made to alternatively rise and collapse. By constructing the bird scare device in this manner, it can be made to fit the needs of an airport for a portable, all day, quiet device that can be placed in fields and within confined spaces (such as under bridges, within window wells, etc.) to scare birds due to the movement.

20 Claims, 9 Drawing Sheets

(56) References Cited

U.S. PATENT DOCUMENTS

| | | | |
|---|---|---|---|
| 2006/0111012 A1* | 5/2006 | Machala | A63H 3/06 446/226 |
| 2008/0017132 A1* | 1/2008 | Merrifield | A01M 29/06 119/719 |
| 2014/0091951 A1* | 4/2014 | Miller | F21V 33/0088 340/908 |
| 2015/0135569 A1* | 5/2015 | Kusanovich | G09F 19/08 40/412 |

* cited by examiner

US 10,278,379 B2

SYSTEMS, METHODS AND DEVICES FOR BIRD SCARE DEVICE

TECHNICAL FIELD

The present disclosure relates to wildlife control and more specifically to bird scare devices.

DETAILED DESCRIPTION

Figure 1:
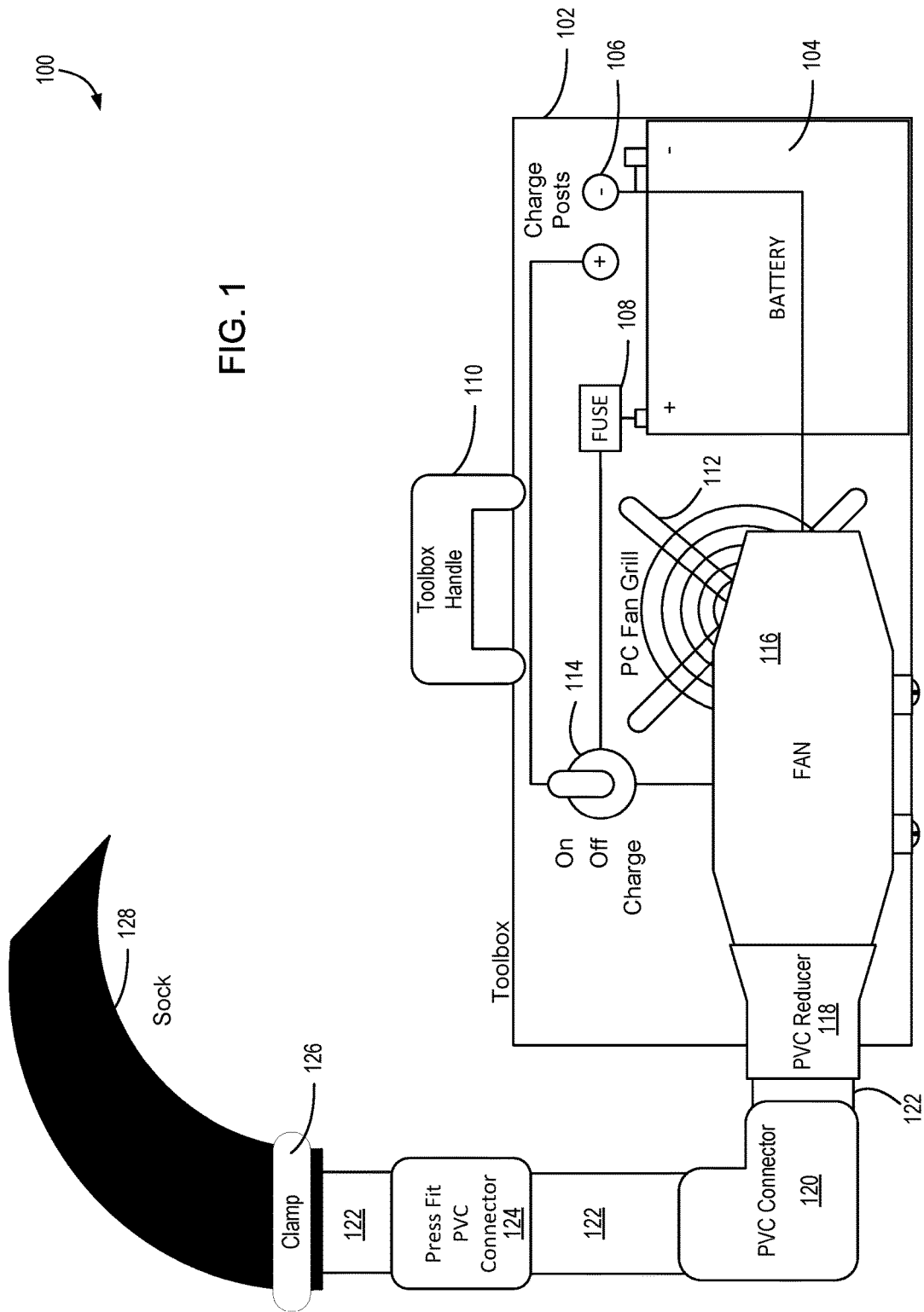
FIG. 1 is a schematic diagram illustrating a bird scare system consistent with embodiments disclosed herein.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable a portable bird scare device that uses airflow to create random movement of a flexible tube, such as an air sock. For example, a portable bird scare device can be constructed from a toolbox, marine fan, waterproof switch, deep-cycle battery, fuse, ripstop nylon tube, plumbing pipe and plumbing pipe connectors. A switch can control power between the fan and a battery protected by the fuse. In some embodiments, the switch can be electronically controlled by a processor (such as a solid-state switch or relay). The fan can drive air from within the toolbox through pipe and connectors to the ripstop nylon tube. By controlling the dimensions of the ripstop nylon tube, the ripstop nylon tube can be made to alternatively rise and collapse. By constructing the bird scare device in this manner, it can be made to fit the needs of an airport for a portable, all day, quiet device (as compared to sound scaring devices) that can be placed in fields and within confined spaces (such as under bridges, within window wells, etc.) to scare birds, aided by the random movement and sounds. In addition, the waterproof components and small size allow use in a variety of conditions, including rain, wind and sun. Airflow of the device through the interior allows the system to remain cool during sunny and/or hot days.

In one embodiment, the bird scare device can include a timer. In one embodiment, the timer can extend the battery life by periodically causing the bird scare device to power on and cause random movement of a sock. In another embodiment, the timer can provide on/off timing based on airport schedule or bird habits. For example, some airports can have few or no flights in late evening or early morning. For example, in some seasons, fewer birds can be active at night. During these periods the bird scare device can be shut down.

In another embodiment, the bird scare device can include sensors. The sensors can be used to determine operating characteristics of the bird scare device. For example, a motion sensor can cause the device to turn on when motion is detected. For example, a flow detector or occlusion detector can determine that the fan or sock is unable to pass airflow and the device can be prevented from turning on and damaging components. In some embodiments, the bird scare device can store and/or report sensor readings to a mobile device or network service.

In an embodiment, the bird scare device can be remotely operated using wireless communication. For example, the bird scare device can use wireless local area networking (WLAN) or Bluetooth™ to communicate with a wireless device. This communication can include commands (such as turning on or off, etc.) or reports (such as sensor logs, activation reports, etc.). In some embodiments, the bird scare devices can form a mesh network to relay communications between them. In some embodiments, the system can report if it is damaged.

Other random motion devices, such as seen at retail stores for advertising, are often high power and large. These air dancers use a large tube (starting at 6 feet), a high power fan and a generator to accomplish movement. The large size, power requirements, generator noise and multiple parts can make it less portable and more distracting for people and pilots at airports.

Turning to FIG. 1, a schematic diagram illustrating a bird scare system 100 is shown. A toolbox 102 forms an exterior support for components of the bird scare system 100. The interior can include a fan 116, a battery 104, a switch 114, charge posts 106 and a fuse 108. The switch 114 can control an electrical setting of the bird scare system 100 to on, off or charge. When off, the fan 116 is electrically disconnected from the battery 104. When the switch 114 is set to charge, the battery 104 is electrically connected to the charging posts 106, while the fan 116 is electrically disconnected. A charger (not shown) can be coupled to the charging posts 106 to provide a charging current and/or voltage to the battery 104. When the switch 114 is set to on, the battery 104 is electrically connected to the fan 116. The fan 116 takes air from the internal space of the toolbox 102 and drives it through a PVC reducer 118 to a pipe 122. The PVC reducer 120 can be placed in a port within the toolbox 102 such that the reducer 118 connects to the fan 116 within the toolbox 102 and connects to a pipe 122 outside the toolbox. The pipe 122 is coupled to an angled PVC connector 120 that directs the airflow upward. The airflow then goes through more pipe 122 that is press-fit to a connector 124. The airflow is then directed into a flexible sock 128 coupled to the pipe 122 with a clamp 126 that alternatively fills with air and collapses, forming random movement. One or more airflow ports can be covered with one or more grills 112 (such as a PC fan grill) to allow air into the interior of the toolbox 102, while keeping contaminants out (e.g., leaves, plant matter, etc.). A fuse 108 can be coupled to the positive terminal of the battery 104 to provide a method of disconnecting the battery 104 if too much current is flowing out of or into the battery 104. A clamp 126 can be used to attach the sock 128 to the pipe 122. In some embodiments, the sock 128 can be coupled to the pipe 122 with other fasteners, including hook and loop, adhesive, interlocking plastic fasteners, etc.

By creating airflow through the toolbox 102, the interior of the bird scare system 100 can be cooled. This can allow better operation of a battery 104 during hot days, in which a heat of operation of the battery 104 and absorbed sunlight can cause the interior of the toolbox 102 to heat up.

By using waterproof components, such as a waterproof switch, sealed battery, toolbox and marine fan, the bird scare system 100 can be made for rugged airport operation in differing weather conditions, including rain, snow, wind and sunny days.

In one embodiment, the fan 116 provides 130 cubic feet per minute (CFM) airflow, the sock 128 is 36 inches long after the edge of the pipe 122 and the sock 128 has a two inch diameter. In testing, a nylon ripstop fabric sock 128 had a variation in length between 25 to 48 inches for random movement operation with the 130 CFM rated fan 116 and two inch diameter sock 128. In an embodiment, the sock 128 has a diameter between 1 and 3 inches and a length between 25 and 48 inches. In another embodiment, the fan 116 is between 100 CFM and 150 CFM, the length of the sock 128 is between 25 and 48 inches and the diameter of the sock 128 is between 0.5 and 4 inches. The sock 128 can be constructed from plastic, nylon, ripstop fabric, waterproof fabric, water resistant fabric and other fabrics that enable airflow through a tube formed of the fabric.

In one embodiment, a body of the bird scare system 100 can be approximately 19 inches by 10.5 inches by 9 inches, in which approximately can mean plus or minus an inch. In some embodiments, the bird scare system 100 length, width and height measurements are between 6 and 48 inches. In some embodiments the body is elongated in a parallel direction with a handle 110. This elongation can allow a more balanced carrying with weight in front of and behind a handle. Other embodiments can include bodies of approximately 23.5 in. by 10 in. by 11 in; 14 in by 5 in by 8 in; or 12 in by 14 in by 22 inches with approximately being plus or minus two inches.

In the embodiment shown, the components avoid attachment to the lid. This allows easy access to the internal structure of the bird scare system 100, without movement of the internal components during opening of the lid.

In one embodiment, a tube 122 to which the sock 128 is attached can be press-fit into a connector 124. This press-fit allows for a quick change of a sock 128 that is pre-attached to a tube 122. In addition, the press fit can enable the sock 128 to be stored within the toolbox. In one embodiment, the press-fit connector is also the PVC reducer 118. The 90 degree connector 120, pipe 122 and sock 128 can be disconnected from the reducer 118 and stored within the toolbox body 102.

Figure 2:
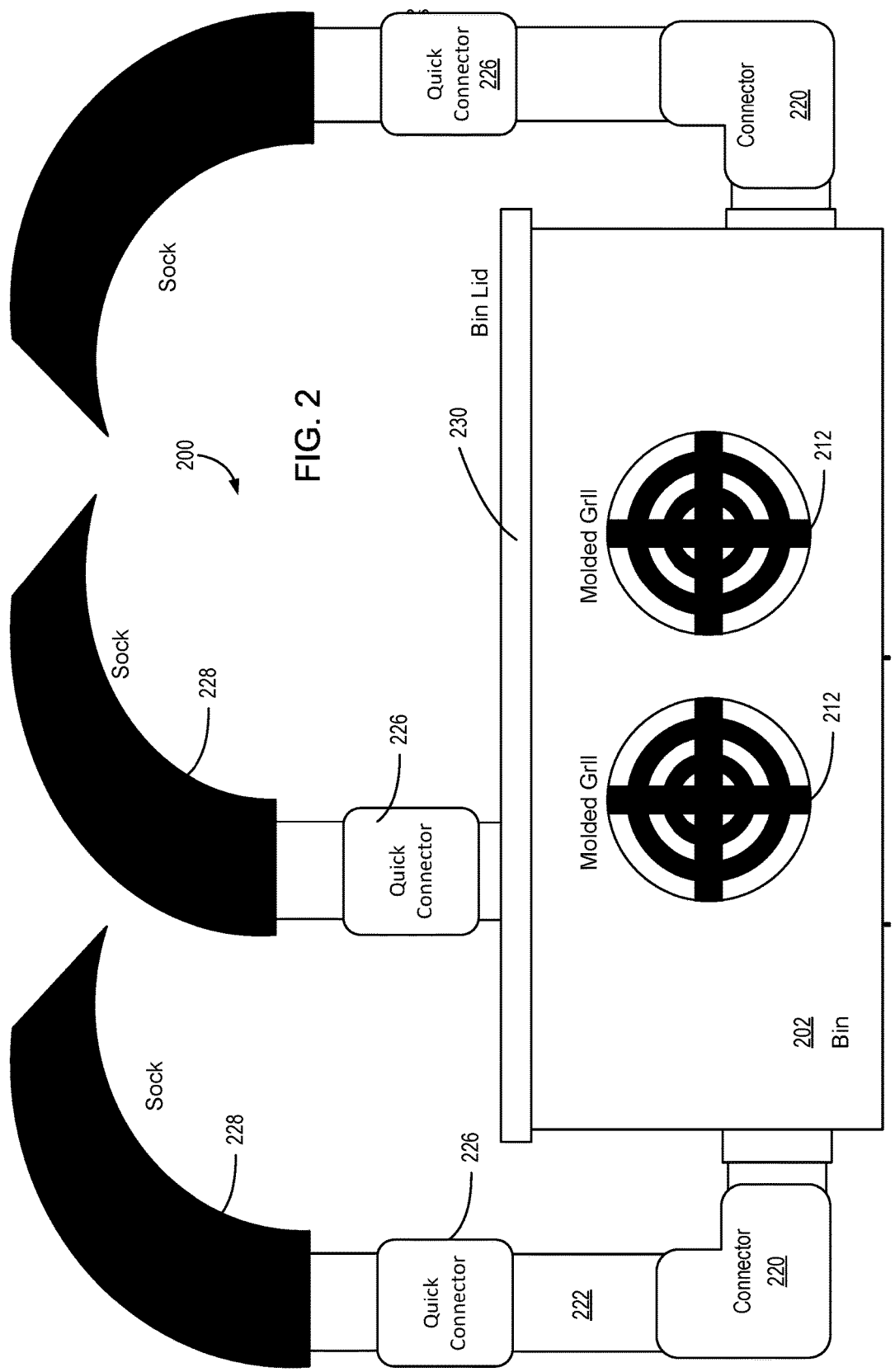
FIG. 2 is a diagram illustrating an alternate bird scare system consistent with embodiments disclosed herein.

FIG. 2 is a diagram illustrating an alternate bird scare device 200 consistent with embodiments disclosed herein. The bird scare device 200 can also be constructed from a bin 202 and lid 230 configuration (e.g., a plastic storage bin, molded container and lid, etc.). In one embodiment the airflow ports can be molded with a grill shape to reduce an influx of contaminants to an interior of the bird scare device. In another embodiment, the airflow ports can be cut, melted or otherwise formed after construction of the bin, and, in some embodiments, using the bin walls themselves to form the grills 212.

The bird scare device 200 can include multiple socks 228 and/or different placement of the socks 228 relative to the bird scare device 200. For example, a bird scare device 200 can include a plurality of socks 228 that are driven by one or more fans. In another example, the socks 228 and tubing can be placed through a side of the container or through the lid 230 of the container. The socks 228 can be removed as a sock unit or sock cartridge (including the flexible tube, rigid tubing and one or more connectors) from a quick connector 226 or connector 220. The connector 220 or quick connector 226 can be a push-fit type connector, twist to lock connector, threaded connector, snap-fit connector or other connector type.

In some embodiments, the bird scare device 200 includes operation while floating in a water body. In one embodiment, the body can include flotation cavities. The flotation cavities can provide buoyancy that prevent the bird scare device from sinking. In another embodiment, the bird scare device can include attachment points that couple with a flotation attachment. The flotation attachment can include flotation devices (e.g., air chambers, foam, etc.) that cause the attachment to float with bird scare device on water. In some embodiments, the bird scare devices can include a tether (such as an anchor, stake, tie down, etc.) that prevents the bird scare device from moving with a water flow (e.g., creek, river, etc.) or be moved by wind.

Figure 3:
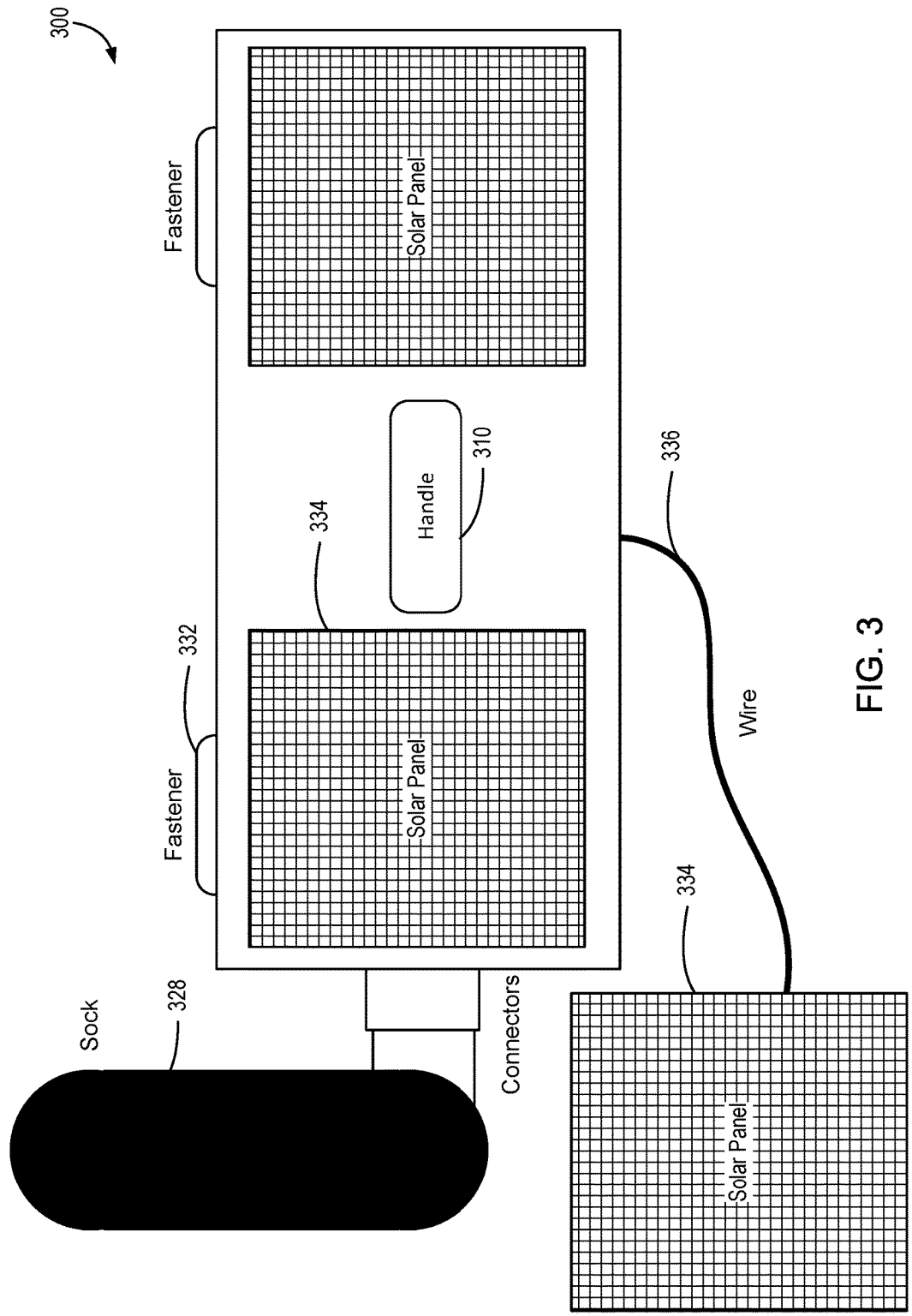
FIG. 3 is a diagram of a solar powered bird scare system consistent with embodiments disclosed herein.

FIG. 3 is a diagram of a solar powered bird scare system 300 consistent with embodiments disclosed herein. The bird scare system 300 can draw power from one or more power sources and/or charge a power source using a secondary power source. Access to one or more of the power sources can be achieved by unfastening the fasteners 332 and lifting a lid of the bird scare device body. In the embodiment shown, one or more solar panels 334 are electrically coupled to the bird scare device. The solar panels 334 can be integrated or attached to a top portion of the container. One or more solar panels 334 can also be remotely placed and electrically coupled to the bird scare devices, such as with a wire 336.

In one embodiment, the solar panels 334 are used to provide power to the bird scare devices. In one example, the power is used to charge an internal power source of the bird scare device. For example, the solar panels 334 can charge a battery or capacitor of the bird scare device. In another example, the power from the solar panels 334 is used to operate the device. In an example, the power is used to both charge a battery and operate the device. In another example, the power provided by the solar panels 334 is used to supplement power from a battery to reduce power consumption from the battery.

Figure 4:
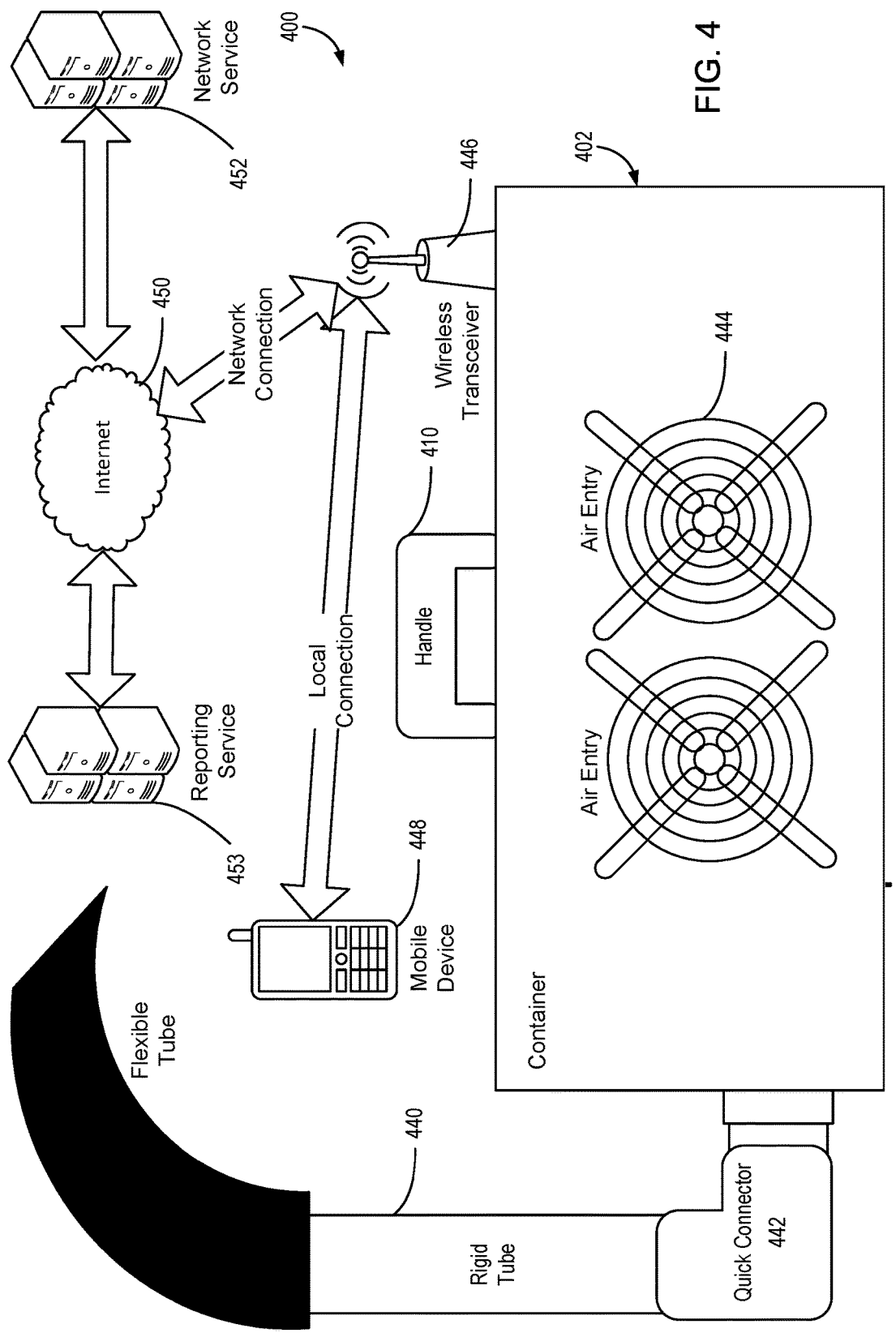
FIG. 4 is a diagram of a wireless enabled bird scare system consistent with embodiments disclosed herein.

FIG. 4 is a diagram of a wireless enabled bird scare system 400 consistent with embodiments disclosed herein. The bird scare device 402 can include a wireless transceiver 446 to receive commands and/or provide data to a mobile device 448 (through local communication) or to a network service 452 (through a network connection, which can be through the Internet 450). In one embodiment, a mobile device 448 can be paired or authorized to communicate with the bird scare device 400. The mobile device 448 can then issue commands to the bird scare device 402 to turn on or off. In another embodiment, the commands can include timing or scheduling of on/off periods for the bird scare device 402. In another embodiment, the commands can include activation of sensors, data collection and/or logging information. In some embodiments, the mobile device is a cell phone or a laptop computer.

In an embodiment, the bird scare device 402 can be configured to store and/or provide data to the mobile device 448. The information can include status, history, sensor logs and or access information.

In one embodiment, the bird scare device 402 can communicate over a network, such as a cell network, Internet 450 or other network, to reach a network service 452. The network service 452 can issue commands and/or receive data from the bird scare device 402. The service 452 can authenticate and/or process requests from users. These requests can result in commands issued to or requests for data from the bird scare device 402. In some embodiments, a hybrid approach can be used. For example, local communication can be used when a mobile device 448 is in range, while network communication can be used when the mobile device 448 is out of range. In another embodiment, the network service 452 can manage authentication, authorization and/or roles. This authentication, authorization and/or role information can be used by the bird scare device 402 to allow access or deny access to features and/or data requested by users and/or mobile devices.

In an embodiment, the bird scare device 402 can include one or more wireless links configurable to communicate with a server and a mobile device 448. An App executing on the mobile device 448 can communicate with the bird scare device 402 and can include a settings screen that allows each bird scare device 402 to receive a name and/or a grouping of bird scare devices. Bird scare devices can be activated via the App by selecting a name or a group. For example, a grouping of bird scare devices can be grouped according to work and a home garden. A user of the App can select a home grouping to activate, while the work devices remain in standby or off.

In another embodiment, the bird scare devices or a service can process reports from other servers (such as reporting service 453) and make a determination on whether to activate the bird scare devices. For example, a weather report can indicate that a heavy rainstorm is incoming. A bird scare device or a server providing a scheduling service for one or more bird scare devices can determine to delay or alter an on-off schedule (or just turn off) based on the storm. In another embodiment, the bird scare device or the server can parse a migratory report and determine a schedule of activation (or de-activation) for one or more bird scare devices and use the schedule.

Figure 5:
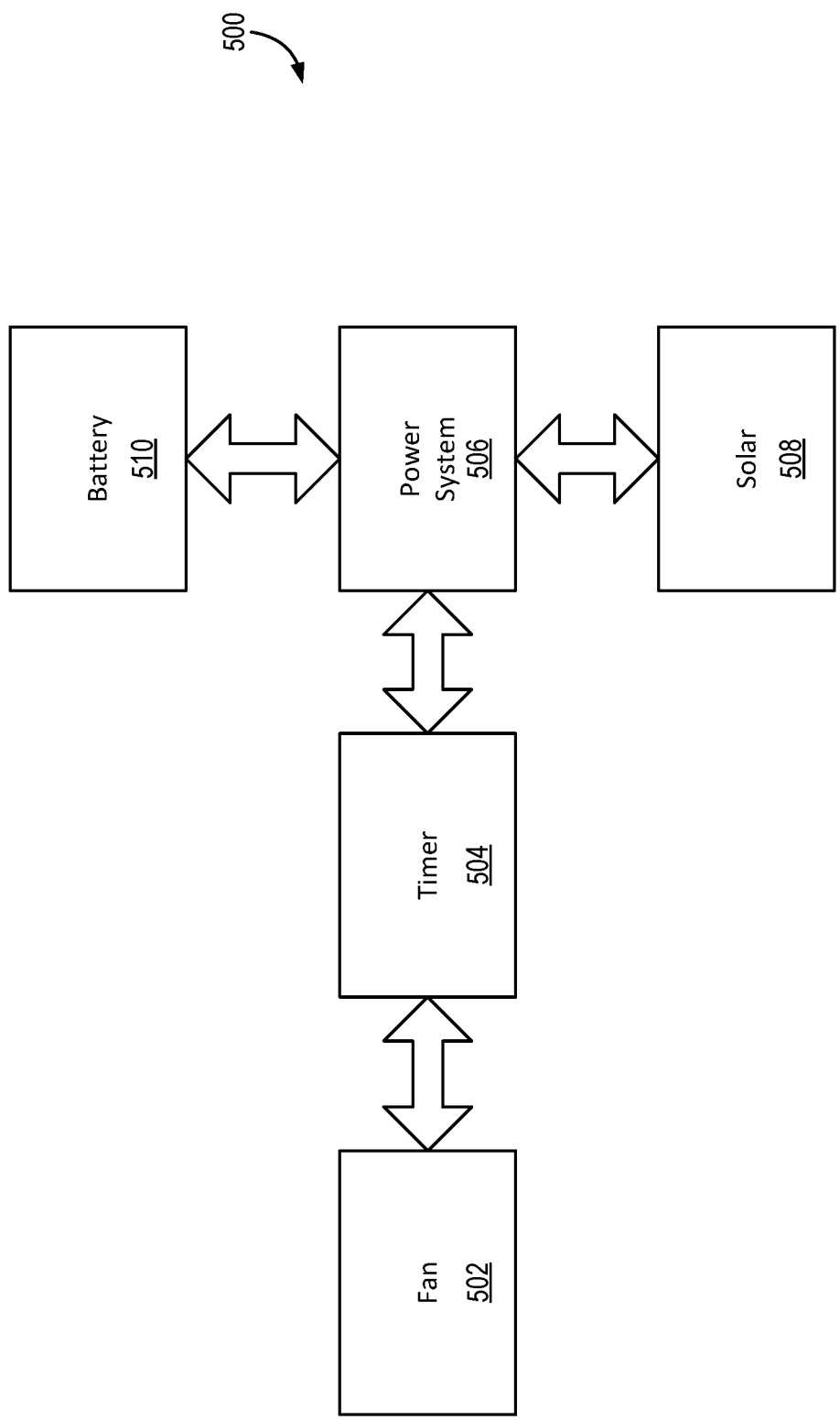
FIG. 5 is a block diagram of a timer enabled bird scare system consistent with embodiments disclosed herein.

FIG. 5 is a block diagram of a timer enabled bird scare system 500. In one embodiment, a power system 506 can be routed through timer circuitry 504. The timer circuitry 504 can control operation of the fan 502 for durations, cycles, schedules, etc. For example, a timer can be configured for periodic operation to extend a length of operation in the field between charging. The timer can also be used to operate on 12 hour shifts, allowing use during the day, but an off cycle during the night. The power system 506 can receive power from multiple sources, including solar 508 and/or battery power 510.

Figure 6:
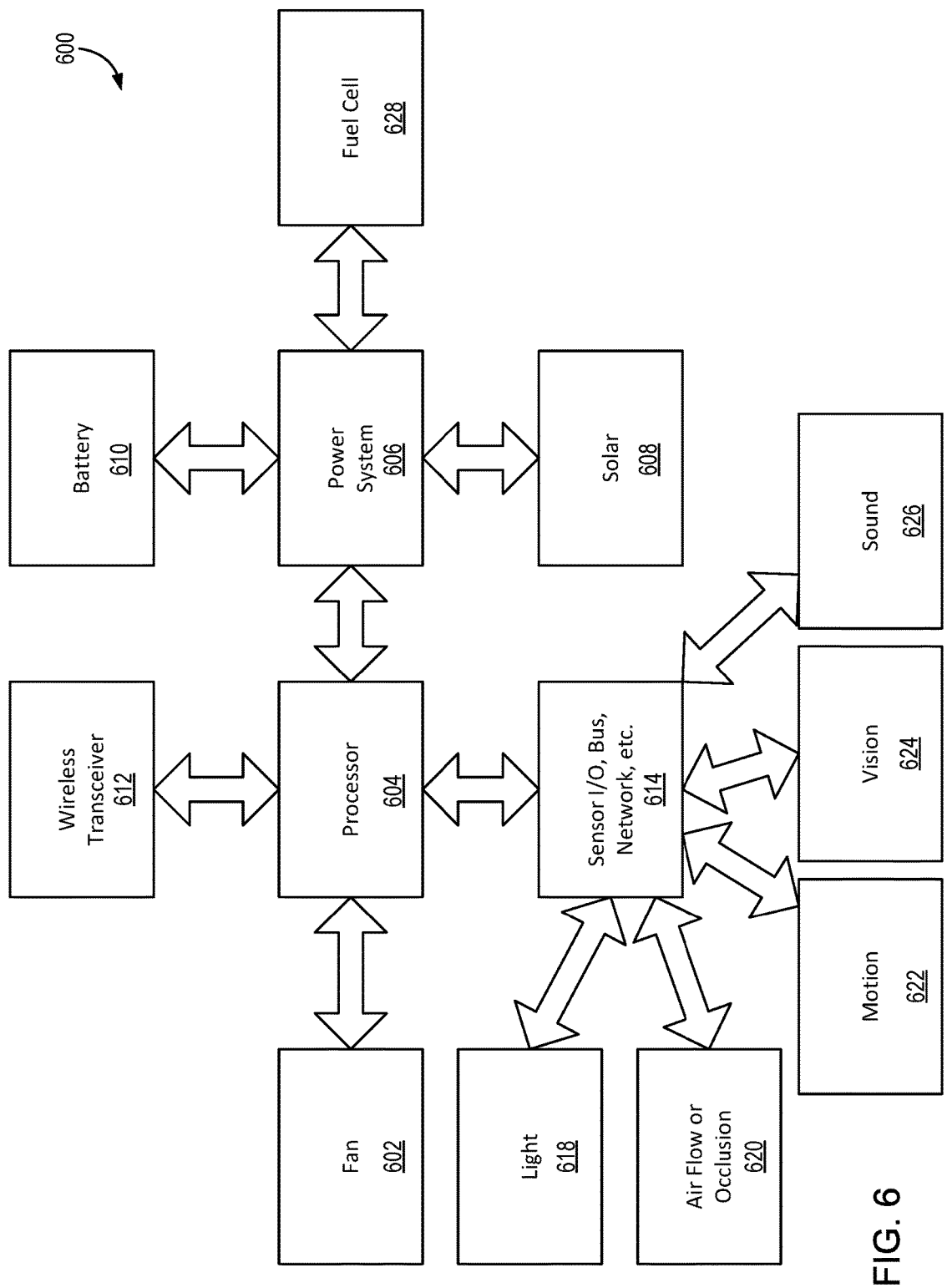
FIG. 6 is a block diagram of a sensor enabled bird scare system consistent with embodiments disclosed herein.

FIG. 6 is a block diagram of a sensor enabled bird scare device 600 consistent with embodiments disclosed herein. A processor 604 can be used to control operations of the bird scare device 600 and respond to information provided by sensors through a sensor bus or network or other input/output 614. In an example, the processor 604 can receive configurations, provide status, transmit reports and/or otherwise communicate data through a wireless transceiver 612 (such as to a mobile device or network service). The processor 604 can also manage a power system 606 and sources, including battery 610, fuel cell 628 and/or solar power 608, among others. The processor 604 can use information from the power system 606 to adjust power draw, such as to achieve a determined amount of field time before recharging and/or refueling. The processor 604 can adjust power draw by turning on or off the fan 602, adjusting power to the fan 602 or removing power from components, such as sensors 618-626.

The processor 614 can use sensors 618-626 to adjust operation of the bird scare device 600 and/or provide information regarding the operation of the bird scare device 600. In one embodiment, the bird scare device 600 uses sensors 618-626 to determine whether to turn on or off the fan 602 based on a schedule and/or likelihood of a bird presence. In another embodiment, sensor data is relayed to a network service. In response to the sensor data, a configuration is provided to the bird scare device 600 by the network service.

Sensors 618-626 can provide information about the surroundings of the bird scare device and/or the status of the bird scare devices. Sensors 618-626 can include detection of sound, motion and/or light. These sensors 618-626 can be calibrated to determine presence of birds in the area. Some sensors 618-626 can be used to determine operations during different conditions (e.g., different on/off cycles for night, day, overcast, etc.). Vision sensors 624 can be locally processed or remotely processed for information about the surroundings including bird presence, time of day, weather conditions, operation of the sock, etc. Status sensors can determine information about the bird scare device itself. For example, an occlusion sensor 620 can determine that airflow to the sock is insufficient for operation. An airflow sensor 620 can aid in determining an amount of power to provide the fan to maintain operation of the sock (such as during different weather conditions). Sensor data can be provided to a mobile device or network service through the wireless transceiver 612.

Figure 7:
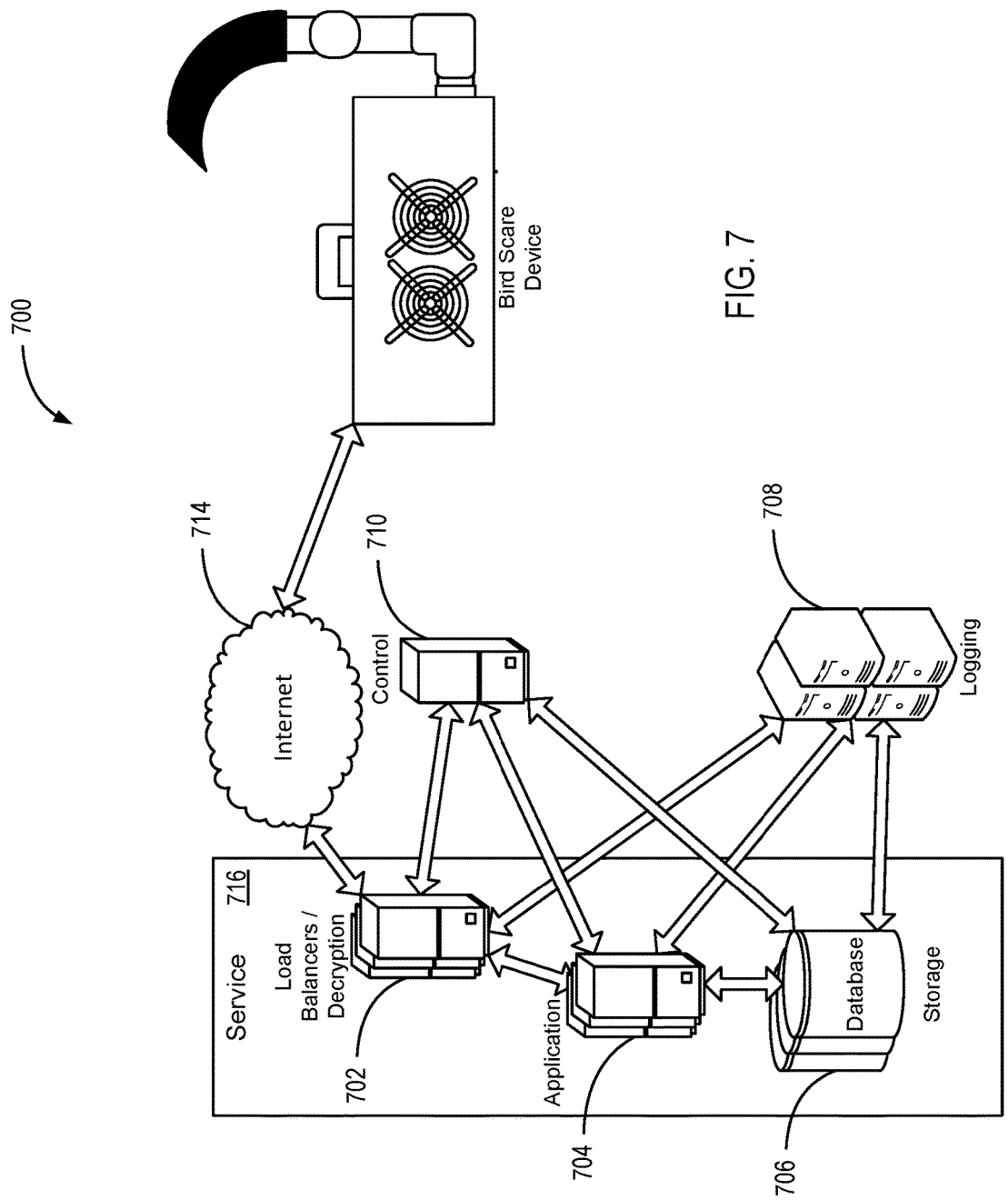
FIG. 7 is a system diagram illustrating a system configured to provide service to a bird scare system consistent with embodiments disclosed herein.

FIG. 7 is a system diagram illustrating a system 700 configured to provide services to a bird scare device consistent with embodiments disclosed herein. A bird scare device can communicate with a service 716 over the Internet 714 as described above. The bird scare service 702 can include load balancers 702 capable of decryption, application servers 704, storage 706, control servers 710 and/or logging server 708. Load balancers 702 can receive requests from bird scare device systems and format the requests to be received by application servers 704. Application servers 704 can receive data from the bird scare device systems, cause data to be stored by data servers 706. The application servers 704 can provide results (such as sensor data, operation time, status, etc.) to the load balancers 702 which transmit the results to user systems requesting the data. Database servers 706 can store data regarding the sensor data, status data, operation data and/or account information. A control server 710 can monitor systems of the service 716 and/or cause servers to be added to pools of servers (such as load balancers 702, application servers 704 and/or database servers 706). The control server 710 can also provide data integrity/redundancy services such as causing snapshotting, caching and/or other features. A logging service 708 can track usage and operations performed by the service 716 and on behalf of the service.

In one example, a user can set up an account with service 716 using an application on a mobile device. The user registers an account with service 716. The service 716 can store user credentials in storage 706. The user can then add a bird scare device to their account. The network service can contact the bird scare device and set up periodic reporting to the network service. A user can access data collected from the bird scare device and provided on a dashboard.

Figure 8:
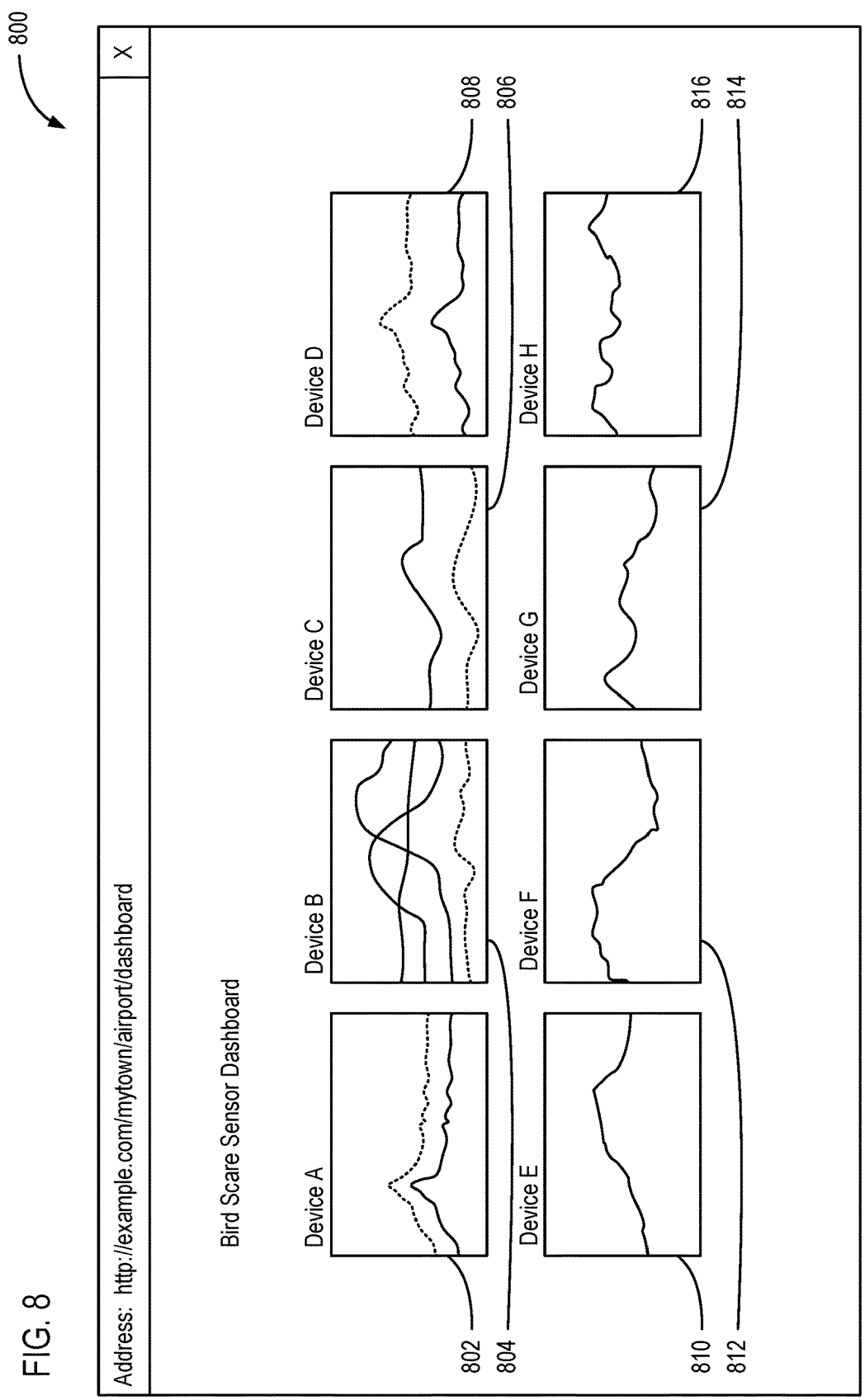
FIG. 8 is a screen diagram showing a dashboard for presenting data from bird scare systems consistent with embodiments disclosed herein.

FIG. 8 is a screen diagram showing a dashboard for presenting data from bird scare systems consistent with embodiments disclosed herein. The dashboard can be implemented by a network service as described in FIG. 7. After logging into the network service through a web browser (or mobile application, etc.), a user can be presented with a dashboard. The dashboard can include data for one or more bird scare devices connected to the network service. In the embodiment shown, each bird scare device is represented by a graph and individual sensor data is represented by a line within the graph. Devices A 802 C 806 and D 808 include two sensors. Device B includes three sensors. Devices E 810, F 812, G 814 and H 816 show a single set of data (such as power draw).

When clicking on a graph, a user can be presented subsequent screens that provide more data and/or command options for each bird scare device (e.g., on/off control, scheduling, sensitivity, etc.). Changes selected by the user can be transmitted as a configuration or commands to one or more bird scare devices. For example, the service can send one or more bird scare devices a schedule for turning on and/or off. By using the network service, multiple bird scare devices can be managed remotely. Problem areas can be identified and further action can be determined for bird hotspots.

Figure 9:
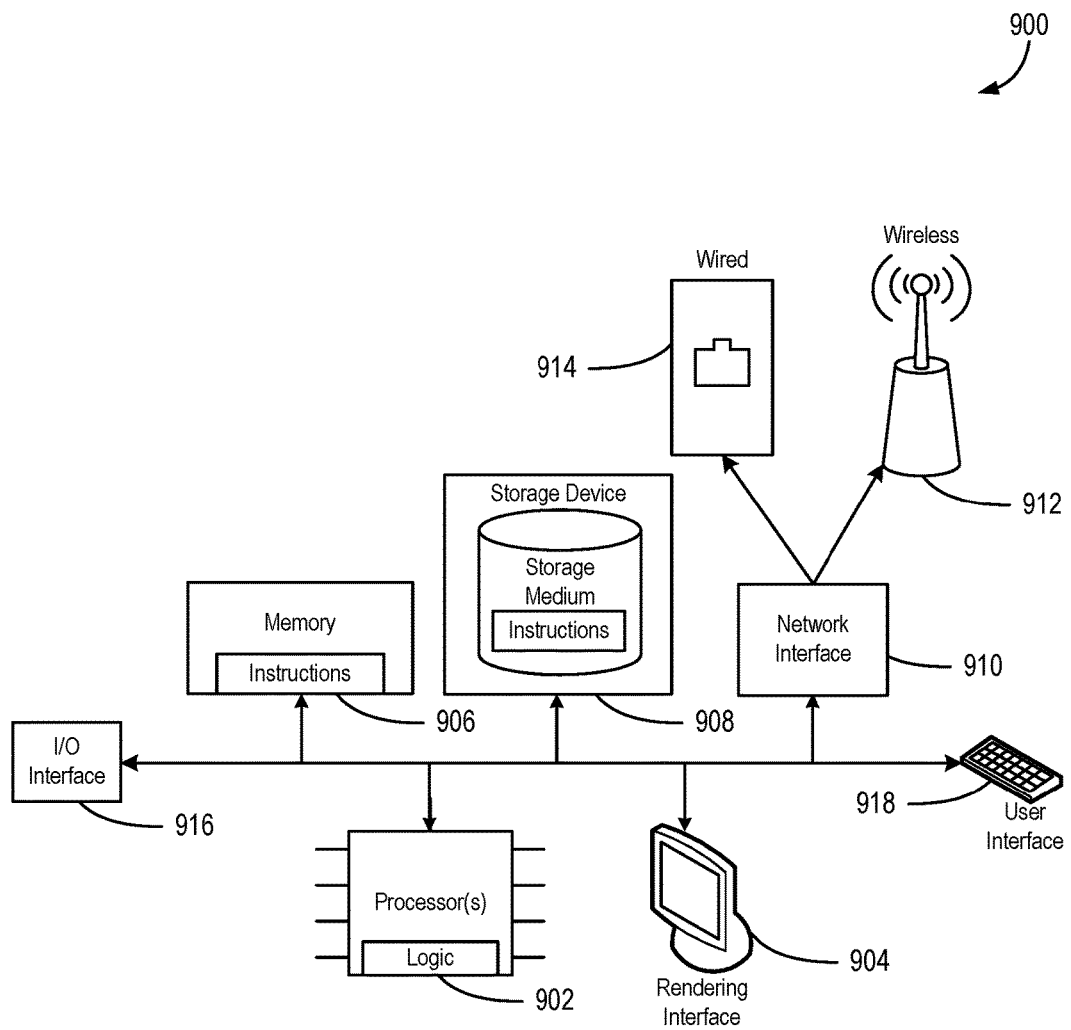
FIG. 9 is a schematic diagram of computing system consistent with embodiments disclosed herein.

FIG. 9 is a schematic diagram of a computing system 900 consistent with embodiments disclosed herein. The computing system 900 can be viewed as an information passing bus that connects various components. In the embodiment shown, the computing system 900 includes a processor 902 having logic 902 for processing instructions. Instructions can be stored in and/or retrieved from memory 906 and a storage device 908 that includes a computer-readable storage medium. Instructions and/or data can arrive from a network interface 910 that can include wired 914 or wireless 912 capabilities. Instructions and/or data can also come from an I/O interface 916 that can include such things as expansion cards, secondary buses (e.g., USB, etc.), devices, etc. A user can interact with a computing system 900 though user interface devices 918 and a rendering system 904 that allows the computer to receive and provide feedback to the user.

EXAMPLES

Example 1 is a bird scare device comprising: a toolbox body, a battery, a fan mounted, the switch, a coupler, tubing, and a ropstop sock. The toolbox body comprising a plurality of airflow ports. The battery within the toolbox body. The fan mounted within the toolbox body and electrically coupled to a switch. The switch, electrically coupled to the battery and the fan, and configured to electrically couple the fan to the battery when the switch is in an operational state and electrically decouple the battery from the fan when in a non-operational state. The coupler extending through a port in the toolbox body, with a first coupling end coupled to the fan and a second coupling end external to the toolbox body. Tubing coupled to the second coupling end and a first end of a ripstop sock. The ripstop sock with a diameter between 1 and 3 inches and a length between 25 inches and 48 inches.

Example 2 is the bird scare device of claim 1, further comprising a solar panel configured to provide power for the fan or the battery.

Example 3 is the bird scare device of claim 1, wherein the tubing coupled to the second coupling end is removably attached to the coupler.

Example 4 is the bird scare device of claim 1, further comprising a wireless transceiver configured to communicate with a mobile device; and a processor configured to electronically control the switch based at least in part on messages received from the mobile device.

Example 5 is a bird scare device body comprising: a battery cavity, one or more ports, a fan, a coupler, and a switch. The battery cavity within the bird scare device body configured to receive a battery. One or more ports formed within walls of the bird scare device body configured to allow airflow into the bird scare device body. The fan mounted within the bird scare device body and configured to direct air from the one or more ports into an input side the fan and out of an output side of the fan. The coupler extending through a port in the bird scare device body, with a first coupling end coupled to the output side of the fan and a second coupling end external to the bird scare device body, the second coupling end configured to receive an exchangeable sock unit, the exchangeable sock unit including a rigid tube and a flexible tube attached to the rigid tube, the exchangeable sock unit configured to receive the air from the fan to flow through the flexible tube causing random motion in the flexible tube. The switch, electrically coupled to the battery and the fan, and configured to electrically couple the fan to the battery when the switch is in an operational state and electrically decouple the battery from the fan when in a non-operational state.

Example 6 is the bird scare device body of claim 5, comprising the exchangeable sock unit comprising including the rigid tube and the flexible tube attached to the rigid tube.

Example 7 is the bird scare device body of claim 6, wherein the flexible tube comprises ripstop nylon.

Example 8 is the bird scare device body of claim 5, wherein the flexible tube has a diameter between 1 and 3 inches and a length between 25 inches and 48 inches.

Example 9 is the bird scare device body of claim 5, comprising the battery.

Example 10 is the bird scare device body of claim 5, wherein the fan is less than or equal to four inches in diameter.

Example 11 is the bird scare device body of claim 5, wherein the coupler is configured to couple to the rigid tube less than or equal to three inches in diameter.

Example 12 is the bird scare device body of claim 5, further comprising a wireless transceiver configured to communicate with a mobile device.

Example 13 is the bird scare device body of claim 5, further comprising: a wireless and a processor. The wireless transceiver configured to communicate over a wireless link. The processor configured to: receive a report from a reporting service; and determine a schedule of activating and deactivating the fan based at least in part on the report.

Example 14 is the bird scare device body of claim 5 further comprising: a wireless transceiver and a processor. The wireless transceiver configured to communicate using a wireless link with a mobile device. The processor configured to process a command from the mobile device received using the wireless transceiver.

Example 15 is the bird scare device body of claim 14, wherein the processor is further configured to receive a configuration from the mobile device indicating a schedule of activation for the fan.

Example 16 is a bird scare device comprising: a body, a battery area, a fan, a switch, and a coupler. The body comprising a plurality of airflow ports. The battery area within the body configured to receive a battery and electrically couple the battery to a switch. The fan mounted within the body and electrically coupled to the switch. The switch, electrically coupled to the battery and the fan, and configured to electrically couple the fan to the battery when the switch is in an operational state and electrically decouple the battery from the fan when in a non-operational state. The coupler extending through a port in the body, with a first coupling end coupled to an output of the fan within the body and a second coupling end external to the body, the second coupling end configured to receive an exchangeable sock unit.

Example 17 is the bird scare device of claim 16, further comprising a processor coupled to the bird scare device, the processor configured to electronically control the switch.

Example 18 is the bird scare device of claim 17, further comprising one or more sensors configured to provide indications to the processor.

Example 19 is the bird scare device of claim 17 further comprising a motion sensor configured to provide an indication or motion to the processor, and the processor further configured to activate the switch to enable the fan.

Example 20 is the bird scare device of claim 16, wherein the exchangeable sock unit comprises including a rigid tube and a flexible tube attached to the rigid tube, the flexible tube configured to randomly oscillate when air is provided by the fan to the exchangeable sock unit.

Example 21 is a method of scaring birds comprising placing a self-contained bird scare body that includes a fan and power supply, attaching an exchangeable sock unit to the self-contained bird scare body and causing the fan to blow air through the self-contained bird scare body and exchangeable sock unit to cause a flexible tube of the exchangeable sock unit to fill and collapse, resulting in random motion of the flexible tube.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

The invention claimed is:

1. A bird scare device comprising:
a toolbox body comprising a plurality of airflow ports;
a battery within the toolbox body;
a fan mounted within the toolbox body and electrically coupled to a switch;
the switch, electrically coupled to the battery and the fan, and configured to electrically couple the fan to the battery when the switch is in an operational state and electrically decouple the battery from the fan when in a non-operational state;

a coupler extending through a port in the toolbox body, with a first coupling end coupled to the fan and a second coupling end external to the toolbox body;

tubing coupled to the second coupling end and a first end of a ripstop sock; and the ripstop sock with a diameter between 1 and 3 inches and a length between 25 inches and 48 inches.

2. The bird scare device of claim 1, further comprising a solar panel configured to provide power for the fan or the battery.

3. The bird scare device of claim 1, wherein the tubing coupled to the second coupling end is removably attached to the coupler.

4. The bird scare device of claim 1, further comprising a wireless transceiver configured to communicate with a mobile device; and a processor configured to electronically control the switch based at least in part on messages received from the mobile device.

5. A bird scare device body comprising:
a battery cavity within the bird scare device body configured to receive a battery;
one or more ports formed within walls of the bird scare device body configured to allow airflow into the bird scare device body;
a fan mounted within the bird scare device body and configured to direct air from the one or more ports into an input side the fan and out of an output side of the fan;
a coupler extending through a port in the bird scare device body, with a first coupling end coupled to the output side of the fan and a second coupling end external to the bird scare device body, the second coupling end configured to receive an exchangeable sock unit, the exchangeable sock unit including a rigid tube and a flexible tube attached to the rigid tube, the exchangeable sock unit configured to receive the air from the fan to flow through the flexible tube causing random motion in the flexible tube;
a switch, electrically coupled to the battery and the fan, and configured to electrically couple the fan to the battery when the switch is in an operational state and electrically decouple the battery from the fan when in a non-operational state.

6. The bird scare device body of claim 5, comprising the exchangeable sock unit comprising including the rigid tube and the flexible tube attached to the rigid tube.

7. The bird scare device body of claim 6, wherein the flexible tube comprises ripstop nylon.

8. The bird scare device body of claim 5, wherein the flexible tube has a diameter between 1 and 3 inches and a length between 25 inches and 48 inches.

9. The bird scare device body of claim 5, comprising the battery.

10. The bird scare device body of claim 5, wherein the fan is less than or equal to four inches in diameter.

11. The bird scare device body of claim 5, wherein the coupler is configured to couple to the rigid tube less than or equal to three inches in diameter.

12. The bird scare device body of claim 5, further comprising a wireless transceiver configured to communicate with a mobile device.

13. The bird scare device body of claim 5, further comprising:
a wireless transceiver configured to communicate over a wireless link; and
a processor configured to:
receive a report from a reporting service; and
determine a schedule of activating and deactivating the fan based at least in part on the report.

14. The bird scare device body of claim 5 further comprising:
a wireless transceiver configured to communicate using a wireless link with a mobile device; and
a processor configured to process a command from the mobile device received using the wireless transceiver.

15. The bird scare device body of claim 14, wherein the processor is further configured to receive a configuration from the mobile device indicating a schedule of activation for the fan.

16. A bird scare device comprising:
a body comprising a plurality of airflow ports;
a battery area within the body configured to receive a battery and electrically couple the battery to a switch;
a fan mounted within the body and electrically coupled to the switch;
the switch, electrically coupled to the battery and the fan, and configured to electrically couple the fan to the battery when the switch is in an operational state and electrically decouple the battery from the fan when in a non-operational state; and
a coupler extending through a port in the body, with a first coupling end coupled to an output of the fan within the body and a second coupling end external to the body, the second coupling end configured to receive an exchangeable sock unit, the exchangeable sock unit including a rigid tube and a flexible tube attached to the rigid tube.

17. The bird scare device of claim 16, further comprising a processor coupled to the bird scare device, the processor configured to electronically control the switch.

18. The bird scare device of claim 17, further comprising one or more sensors configured to provide indications to the processor.

19. The bird scare device of claim 17 further comprising a motion sensor configured to provide an indication or motion to the processor, and the processor further configured to activate the switch to enable the fan.

20. The bird scare device of claim 16, wherein the flexible tube is configured to randomly oscillate when air is provided by the fan to the exchangeable sock unit.

* * * * *